United States Patent [19]

Gerdes

[11] 4,305,522
[45] Dec. 15, 1981

[54] LOCKING CAP WITH A SPRING SEAT BETWEEN THE OUTER CAP AND INSIDE COVER

[75] Inventor: Theodor Gerdes, Langenfeld, Fed. Rep. of Germany

[73] Assignee: Blaue KG Fabrik fur Kraftfahrzeugteile, Langenfeld, Fed. Rep. of Germany

[21] Appl. No.: 96,042

[22] Filed: Nov. 20, 1979

[30] Foreign Application Priority Data

Nov. 20, 1978 [DE] Fed. Rep. of Germany ....... 2850277

[51] Int. Cl.³ ...................... B65D 41/16; B65D 55/14
[52] U.S. Cl. ................................... 220/200; 220/210; 220/306; 220/DIG. 33
[58] Field of Search ............ 220/203, 303, 210, 86 R, 220/DIG. 33, 293, 200, 306, DIG. 32

[56] References Cited

U.S. PATENT DOCUMENTS

| | | | |
|---|---|---|---|
| 2,816,433 | 12/1957 | Friend | 220/210 X |
| 3,516,572 | 6/1970 | Davis | 220/306 |
| 3,628,686 | 12/1971 | Burton et al. | 220/306 |
| 3,684,817 | 8/1972 | Card, Jr. et al. | 220/306 X |
| 3,815,776 | 6/1974 | MacMillan | 220/203 X |
| 3,968,880 | 7/1976 | Ostrowsky | 220/306 X |
| 4,013,191 | 3/1977 | Gerdes | 220/210 X |
| 4,079,952 | 3/1978 | Nishio et al. | 220/86 R X |
| 4,136,795 | 1/1979 | Crute et al. | 220/303 X |
| 4,142,756 | 3/1979 | Henning et al. | 220/86 R X |
| 4,157,766 | 6/1979 | Gerdes | 220/306 |
| 4,164,302 | 8/1979 | Gerdes | 220/210 |
| 4,168,011 | 9/1979 | Lomer | 220/303 X |
| 4,177,931 | 12/1979 | Evans | 220/DIG. 33 |

FOREIGN PATENT DOCUMENTS

718875  2/1942  Fed. Rep. of Germany ...... 220/203

Primary Examiner—Allan N. Shoap
Attorney, Agent, or Firm—Gifford, VanOphem, Sheridan & Sprinkle

[57] ABSTRACT

A locking cover for a pipe connection having an inner member with a radial sealing flange detachably locked with an overlapping outer cap by means of a locking mechanism. The locking mechanism comprises engaging projections, extending radially inward from the wall of the cap, which in turn includes a guide surface directed inward as well as a connecting surface to engage the sealing flange. The connecting surface is bent in a convex or arcuate shape from the radial inner end of the guide surface to the wall of the cap. Thus, the sealing flange lies with its edge on the connecting surface. In this way the outer cap can spring loose when force of a given magnitude is exerted upon the inner member without breaking the locking mechanism.

4 Claims, 6 Drawing Figures

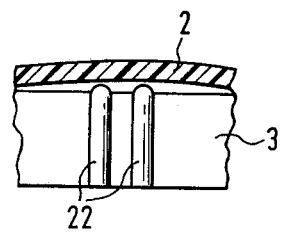
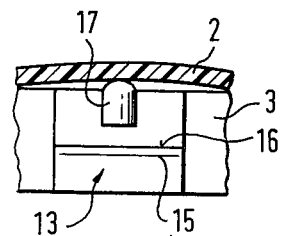
FIG. 4   FIG. 3
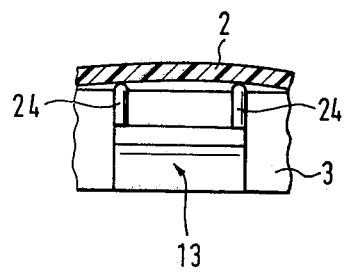
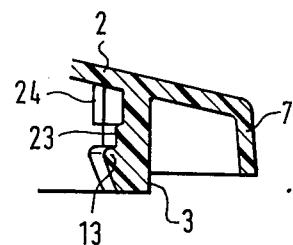
FIG. 5   FIG. 6

LOCKING CAP WITH A SPRING SEAT BETWEEN THE OUTER CAP AND INSIDE COVER

BACKGROUND OF THE INVENTION

The invention concerns a locking cover for a piping connection, in particular, for an automobile gas tank cap. It comprises a sealing flange which engages the piping connection as well as a radially located sealing flange, on the inner-part of the cap. An outer cap made of flexible material engages the sealing flange and is held to it via a locking mechanism. The locking mechanism has radially directed projections from the inner side of the wall of the cap. These projections on the inside of the cover and outer cap engage the sealing flange from behind and at the same time engage a guide surface directed toward the base of the cap in such a way as to provide a firm connection adjacent to the sealing flange.

DESCRIPTION OF THE PRIOR ART

A locking cover of this type is disclosed in German patent 77-23-468 (U.S. Pat. No. 157,766. According to it, the inside of the cover and outer cap are joined together in the following way: the inside of the cap along with the sealing flange is placed on the guide surfaces of the projections and pushed into the outer cap, whereby the projections, under stress from the wall of the cap, give way while the sealing flange slides by, after which they snap back into place. The connection surface on the projections is, by virtue of its well known shape, directed radially. In its assembled state, consisting of the inside of the cover and outer cap, it lies flat on the side of the sealing flange opposite to the base of the cap.

According to the above mentioned application of the locking gas cap, to prevent theft of gas, there is the danger that in an accident, due to stress on the car, relatively large forces will be exerted upon the outer cap. Because the outer cap, according to its known design, is practically inseparable from the inside of the cover, by virtue of locking the inside of the cover behind the projections of the outer cap, there is the danger that the forces exerted upon the inside of the cover will be transmitted and the gas cap will no longer sit tightly on the connector flange.

The first possibility of eliminating this danger lies in the fact that the outer cap should be made of material weak enough, so that the outer cap will be disconnected from the inside of the cover, by virtue of rupturing the projections, before any damage can be done to the inside of the cover. This has the effect that it may be used more than once and secondly, the required force to rupture the outer cap and separate it from the inside of the cover, has not been sufficiently determined.

According to German Published Specification De-OS 26-57-747 (U.S. Pat. No. 4,142,756), it is further known that the inside of the cover and outer cap can be connected with a snap-release mechanism so that the outer cap under force, such as those exerted in an automobile accident, will separate from the inside of the cover or moreover, will transmit the force to the filler connection. This known solution according to German Application DE-OS 26-57-747 is relatively expensive because special locking elements must be used to connect the inside of the cover with the outer cap.

SUMMARY OF THE PRESENT INVENTION

The invention sets forth the task of constructing a locking cap of the known design, in the simplest way possible, so that when the forces of a given magnitude, act upon the outer cap, it will in turn be separated from the inside of the cover without rupturing.

This task is solved by the invention in the following way: the connecting surface from one of the convex cylindrical joints between the radial inner edge of the surface of the guide and the wall of the cap, or one of the radial boundaries to the base of the cap, is formed from the projection. The radial dimension of the sealing flange relative to the outer cap is set so that the sealing flange lies radially inside the connecting surface.

By virtue of the construction of this invention, the inside of the cover will be attached to the projections only over a small radial area of the sealing flange. The periphery of the sealing flange lies on the connecting surfaces of the projection. Practically speaking, it lies only along the length of the line of contact. In this way, the rupture forces between the periphery of the sealing joint and projections when the outer cap is lifted from the inside of the cap, are relatively well defined. Due to the construction of the connecting surfaces, according to the invention, a radial component of force is automatically produced when the outer cap is lifted away from the inside of the cover due to the axial force components of the total exerted force. This radial component then pushes out the wall of the cap, located in the region of the projections, so that the projections under the sealing flange will snap-out and in this way release the outer cap from the inside of the cover. This construction, according to the invention, will make it possible for the locking cap to be lifted away from the inside of the cover without being destroyed and accomplishes this through the simplest means by using a relatively well defined lifting force. Because the required lateral deflection of the projections, when the outer cap is separated from the inside of the cover, are very slight, the construction proposed by the invention is particularly suitable for outer caps which are made of relatively rigid material or because of their construction have relatively low elasticity.

The outward pressure exerted by the outer cap upon the inside of the cover as well as the lifting force which it exerts on the inside of the cover is further reduced by the connecting surface, as seen in one of the sections containing the axis of the cover, being significantly bent into a circular arc. Preferably, the supports for the projections, from the wall of the cap, will be directed radially inward. The axial clearance from the projections is approximately equal to the axial extension from the periphery of the sealing flange. This gives the periphery of the sealing flange between the supports and connecting surface, the possibility of expanding. Furthermore this leaves a buffer zone between the sealing flange and base of the cap. Such a buffer is located, as in the above cases where the inside of the cover is provided with an overflow valve to vent the entrapped reservoir of liquid. In addition to this, there is also the possibility for the outer cap and inside of the cover to freely rotate against each other without a great amount of friction. This can occur if the outer cap is provided with a cylinder lock that holds the outer cap immoveable with respect to the inside of the cover and in one position provides for opening and locking the locking cap. The lock, in its other position, releases the immoveable connection between the outer cap and inside of the cover.

In order to center the sealing flange inside the outer cap, it is preferrable to place the projecting spacing pieces radially along the circumferance of the inner surface of the wall of the cap. In this way, it is asserted that all of the projections along the edge of the sealing flange will be engaged to the same extent. The spacing pieces are preferrably constructed from pieces of pressed material which are formed in the wall of the cap in the region of the projections. These pieces of pressed material have the additional advantage of preventing the danger of rupturing the projections when the outer cap is forcibly lifted away from the inside of the cover.

Preferably, the edge of the sealing flange, as viewed in one of the cross-sections along the axis of the cover, will be bent in a well defined circular arc, so that the sealing flange will lie lengthwise along one of the lines of contact between the sealing flange and projection. A relatively exact bend in the edge of the sealing flange can, in the simplest way, be maintained by constructing the inside of the cover with a dual wall and in the area of the edge of the sealing flange, bend the edge of one wall over the edge of the other wall. If the sealing flange, due to its construction, is too thin to be bent into a uniform arc, a suitable ring can be placed in the area between the two walls.

Due to the solution within the scope of the invention, that is, due to the forces exerted perpendicular to the axis of the cover, the outer cap can spring away from the inside of the cover without being broken, so that none of the actual forces exerted on the inside of the cover will be transmitted. Thus, the cover can remain firmly seated upon the connecting pipe.

DESCRIPTION OF THE DRAWINGS

Additional characteristics and advantages will be given in the following description, which is done in conjunction with the accompanying drawings listed below:

FIG. 3. A section along line III—III in FIG. 1.

FIG. 4. A section along line IV—IV in FIG. 1.

FIG. 5. A section-view from FIG. 3 through a modified version of the invention.

FIG. 6. A section of the view along the line II—II corresponding to the modified construction of the outer cap.

DESCRIPTION OF A PREFERRED EMBODIMENT OF THE PRESENT INVENTION

Figure 1:
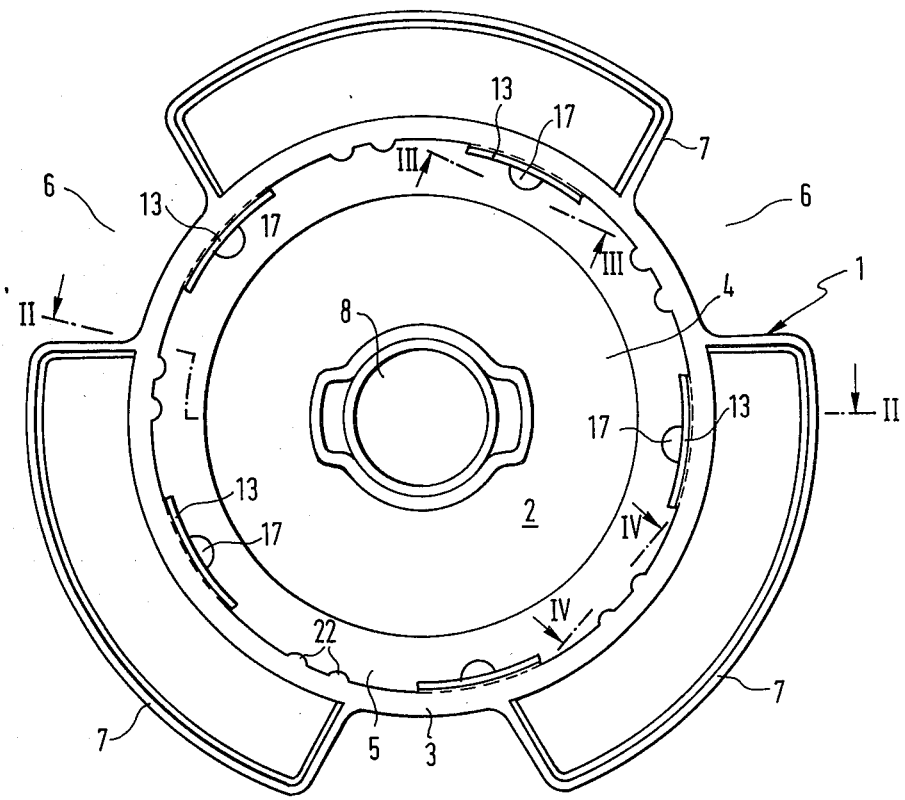
FIG. 1. A view of the outer cap of the locking cover as seen from below.

In FIG. 1, one sees the outer cap 1, with the base 2 of the cap 1 and an essentially cylindrical wall 3 of the cap 1. The base 2 is provided with an essentially conically tapered middle section 4 and a section of a tapered ring 5 which surrounds it. Along the outer circumferance of the wall 3, there are three engaging pieces 7 separated by openings 6, each of equal size. The engaging pieces 7 are constructed as an integral part of the wall 3. In the center of the base 2 an opening, 8 is provided for inserting a cylinder lock, not shown in the diagram. The cylinder lock furthermore serves to firmly hold the outer cap 1, with the corresponding part of the inside of the cover 9, shown in FIG. 2, or it can allow the outer cap 1 to be freed when turned with respect to the inside of the cover 9.

The inside of the cover 9 forms a cup-shaped breech lock 10 which engages and locks into a piping connection, not shown in the figure, to form an inlet pipe for gasoline tanks. A sealing flange 11 has a sealing ring 12 on the bottom, which presses against the edge of the connector when the inside of the cover 9 with its breech lock 10, engages the piping connector and by means of a coil or bayonet locking mechanism, not shown here, is tightened and locked.

Projections or catches 13 bent parallel to the axis of the cover are formed with regular spacing along the inside of the wall 3 to assure the locking connection or provide a spring-seat between the inside of the cover 9 and the outer cap 1.

Figure 2:
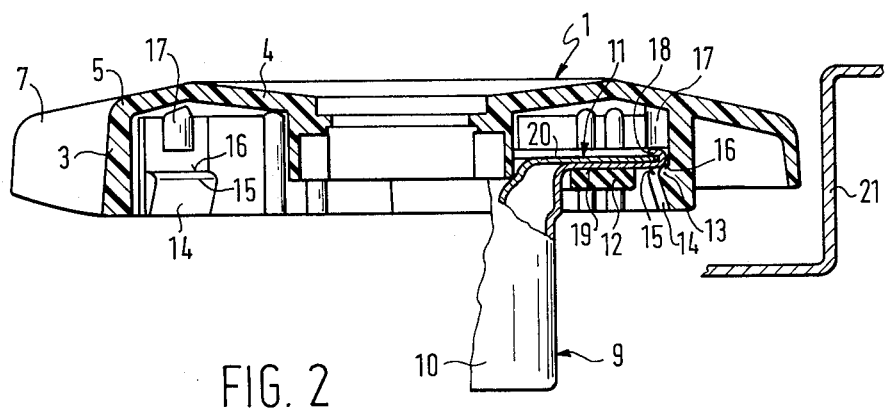
FIG. 2. A section through the outer cap of FIG. 1 and a section of the inside of the cover along line II—II in FIG. 1.

Referring now to FIG. 2, the projections 13 are at the same time provided with a directional surface 14, which extends from the free edge of the wall 3 radially inward to the base 2 and through a junction 15, into a radial boundary surface 16. Each projection 13 is disposed below on a support element 17, which extends from the base 2 in the direction along the projection 13 and has a gap between it and the projection, which corresponds to the axial dimension of the circumference of the sealing flange 11. If the outer cap 1 rests on the sealing flange 11 on the inside of the cover 9, so that the edge of the sealing flange 11 lies on the directional flange 14 and presses against the inside of the cover 9, then the projections 13 will give way under slight stress from the wall 3 directed radially outward until the edge of the sealing flange 11, which is located in the area between the projections 13 and support elements 17, disengages.

As one can see from FIG. 2, the outer edge of the sealing flange 11—as shown in one of the sections along the axis of the cover—is bent in a well defined arc and the sealing flange is dimensioned so that it lies along its edge on the junction 15, which serves as a connecting surface. Through the convex bend of the junction 15 and edge of the sealing flange 11, it lies practically lengthwise on one of the lines of contact along the projections 13. That is, the sealing flange 11 will be supported in only a very small radial region by the projections 13. In order to assure the thinnest possible line of the contact, the outer radial edge of the sealing flange 11—shown in the section in FIG. 2, is bent in a well defined arc. The evenly bent arc can be achieved by bending the outer radial edge 18 on the outer wall of the double walled cover over the inner wall 20.

If the car body, as indicated by 21 in FIG. 2, is in any way deformed, such as in an accident, and unforeseen strong forces are exerted upon the locking cover, then as a result of the thin contact surface between the sealing flange 11 and projections 13 as well as the pitch of the connecting surface 15 opposite the axis of the cover, the outer cap 1 will be sprung loose from the sealing flange of the inside cover 9, without transmitting the engaging forces on the outer cap to the inside of the cover 9. In this way, the sealing flange 11 of the inside locking cover 9 which engages the connecting pipe with its expansion ring 12, presses firmly against the edge of the connector. Due to the small contact surface between the sealing flange 11 and the projection 13, the necessary forces to spring the outer cap 1 are determined with sufficient precision.

According to the representation shown in FIGS. 1, 2, and 4 two semicylindrical projections 22 with parallel axes are formed between the projections 13 and the inside of the walls of the cap. They serve as centering elements in order to center the inside of the cover 9 with its sealing flange 11 inside the outer cap and in this way provide uniform supporting elements on all projections 13. This centering, can according to FIG. 6, also result from the thickening 23 in the wall of the cap 3 in the region of the projections 13. This thickening or spacing element 23 in the wall 3 also has the advantage that it reduces the tapering of the projections 13 and thus reduces the danger that the projections 13 will be torn away from the inside of the cover 9 when the outer cap 1 is forcibly sprung. According to FIGS. 1 to 4, the centering elements or projections 22 used, can also be used for establishing a rotation free connection between the inside of the cover 9 and outer cap 1.

According to FIG. 5 the support element 17, which is used according to FIGS. 1 through 4, can also be replaced by two support elements 24, which are formed in the region of the ends of each projection 13. In this way, a better mounting element will be provided for the edge of the sealing flange 11 between the support elements and projections.

I claim:

1. A locking cover for the gasoline inlet pipe of a motor vehicle comprising:
    a cap having a base and a side wall portion axially extended from said base, said side wall being at least slightly resilient;
    an inner member having a stem portion received in the inlet pipe and a flange extending radially outwardly from said stem, said flange being dimensioned to fit within said side wall portion;
    at least two radially inwardly extending projections spaced from the base of the cap and extending from the inner peripheral surface of said side wall portion, wherein said projections taper radially inwardly toward the base of said cap to form a guide surface;
    wherein the radially innermost end of each of said at least two projections is formed in an arc, said arc extending from said guide surface to said side wall portion and extending past the outermost end of said flange portion when said inner member is inserted in said cap and wherein said flange abuts against said projection along said arcuate portion;
    further comprising at least one support element having an abutment surface extending radially inward from said side wall near each said projection and so that each of said at least one support element is associated with one of said projections and said abutment surface is axially spaced from said projection a distance substantially the same as the axial width of the peripheral edge of said flange;
    further comprising circumferentially spaced spacer elements extending radially inward from said side wall; and
    wherein each said spacing element is a thickened portion of the wall of the cap axially intermediate the projection and its associated at least one support element.

2. The invention as defined in claim 1 wherein the periphery of the flange is bent into an arc.

3. The invention as defined in claim 2 wherein said inner member is constructed of two panels to form a double walled inner member, said panels being parallel to and substantially adjacent each other along the flange, and terminating near the outer peripheral edge of said flange, and at the peripheral edge of the flange the edge of one of the panels of the inner member is bent over the edge of the other panel of the inner member.

4. The invention as defined in claim 3 wherein a ring is placed between the two panels along the edge of the flange.

* * * * *

UNITED STATES PATENT AND TRADEMARK OFFICE
CERTIFICATE OF CORRECTION

PATENT NO. : 4,305,522
DATED : December 15, 1981
INVENTOR(S) : Theodor Gerdes

It is certified that error appears in the above-identified patent and that said Letters Patent are hereby corrected as shown below:

Column 1, line 24, delete "157,766" and insert --4,157,766-- therefor.

Column 3, line 4, delete "preferrable" and insert --preferable-- therefor.

Column 3, line 9, delete "preferrably" and insert --preferably-- therefor.

Signed and Sealed this

Thirtieth Day of March 1982

|SEAL|

Attest:

Attesting Officer

GERALD J. MOSSINGHOFF
Commissioner of Patents and Trademarks